United States Patent
Roberts et al.

(10) Patent No.: US 6,231,711 B1
(45) Date of Patent: *May 15, 2001

(54) METHODS AND APPARATUS FOR MAKING PAINT ROLLER COVERS WITH THERMOPLASTIC CORES

(75) Inventors: William J. Roberts, West Salem; Steven V. Middlesworth, Wooster; Ricky L. Dilyard, Smithville; Serafin J. Gerardo, Mansfield; Dennis D. Humphrey, Wooster, all of OH (US)

(73) Assignee: The Wooster Brush Company, Wooster, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/238,451

(22) Filed: Jan. 28, 1999

Related U.S. Application Data (60) Continuation-in-part of application No. 08/645,846, filed on May 14, 1996, which is a division of application No. 08/381,541, filed on Jan. 31, 1995, now Pat. No. 5,537,745.

(51) Int. Cl.[7] .................................................. B65H 81/00
(52) U.S. Cl. .......................... 156/188; 156/195; 156/429; 156/431; 156/446; 29/895.211; 492/48
(58) Field of Search ........................... 29/895.211, 33 D, 29/33 Q; 492/48; 156/187, 188, 195, 429, 430, 431, 446, 499, 500, 250, 269

(56) References Cited

U.S. PATENT DOCUMENTS

| Re. 35,526 | 6/1997 | Garcia | 156/187 |
|---|---|---|---|
| 1,943,215 | 1/1934 | Dunlap | 154/83 |
| 2,500,573 | 3/1950 | Rockoff | 154/83 |
| 2,502,638 | 4/1950 | Becht | 154/83 |
| 2,731,067 | 1/1956 | Miller | 154/1.7 |
| 2,812,007 | 11/1957 | Touchett et al. | 154/1.8 |
| 3,030,696 | 4/1962 | Serwer | 29/127 |
| 3,229,351 | 1/1966 | Peterson et al. | 492/48 |
| 3,301,734 | 1/1967 | Britton et al. | 156/425 |

(List continued on next page.)

FOREIGN PATENT DOCUMENTS

WO94/07679   4/1994   (WO) .

OTHER PUBLICATIONS

Himont Development Data Sheet (1 page) for "Polypropylene for High–Speed Extrusion Coating and Laminating", 1985, 1988.

Himont Product Data Sheet No. 510–2 (2 pages) for "Propylene Copolymers for High Extrudate Strength", 1985, 1988.

*Primary Examiner*—James Sells
(74) *Attorney, Agent, or Firm*—Renner, Otto, Boisselle & Sklar, LLP (57) ABSTRACT

Methods and apparatus for making paint roller covers by spirally wrapping a strip of hot thermoplastic film onto an exterior surface of a thermoplastic tubular form and spirally wrapping fabric strip having a thermoplastic backing onto the spiral wound strip of thermoplastic film while the thermoplastic film is still sufficiently hot to cause the thermoplastic film to flow into interstices in the fabric backing and permanently bond the fabric strip to the exterior surface of the tubular form. The tubular form may either comprise a plurality of preformed tubes or be formed by spirally wrapping a continuous length of core strip material around a mandrel while maintaining the adjacent edges of the core strip material in closely spaced, nonoverlapping relation to form a spiral seam between the core strip edges. In the latter case, the adjacent edges of the hot thermoplastic film may be overlapped outwardly of the spiral seam to provide additional adhesive at the spiral seam for flow into the spiral seam and into the interstices in the fabric backing outwardly of the spiral seam.

38 Claims, 7 Drawing Sheets

U.S. PATENT DOCUMENTS

| | | | |
|---|---|---|---|
| 3,376,180 | 4/1968 | Larson | 156/195 |
| 3,453,163 | 7/1969 | Mills et al. | 156/190 |
| 3,700,520 | 10/1972 | Hielema | 156/162 |
| 3,905,853 | 9/1975 | Stent | 156/182 |
| 4,038,731 | 8/1977 | Hill | 29/132 |
| 4,191,792 | 3/1980 | Janssen | 427/260 |
| 4,692,975 | 9/1987 | Garcia | 29/120 |
| 5,137,595 | 8/1992 | Garcia | 156/425 |
| 5,195,242 | 3/1993 | Sekar | 29/895.21 |
| 5,206,968 | 5/1993 | Bower et al. | 15/230.11 |
| 5,273,604 | 12/1993 | Garcia | 156/187 |
| 5,397,414 | 3/1995 | Garcia et al. | 156/187 |
| 5,398,409 | 3/1995 | Sekar | 29/895.21 |
| 5,468,207 | 11/1995 | Bower et al. | 493/297 |
| 5,537,745 * | 7/1996 | Musch et al. | 29/895.211 |
| 5,572,790 | 11/1996 | Sekar | 29/895.211 |
| 5,614,047 | 3/1997 | Garcia | 156/187 |
| 5,694,688 * | 12/1997 | Musch et al. | 29/895.211 |

* cited by examiner

METHODS AND APPARATUS FOR MAKING PAINT ROLLER COVERS WITH THERMOPLASTIC CORES

CROSS-REFERENCE TO RELATED APPLICATIONS

This application is a continuation-in-part of U.S. patent application Ser. No. 08/645,846, filed May 14, 1996, which is a divisional of U.S. patent application Ser. No. 08/381,541, filed Jan. 31, 1995, now U.S. Pat. No. 5,537,745, dated Jul. 23, 1996.

FIELD OF THE INVENTION

The present invention relates to methods and apparatus for making roller covers by adhering a roller fabric to a thermoplastic tubular form by means of an extruded thermoplastic film that is spirally wrapped onto the tubular form immediately prior to the roller fabric.

BACKGROUND OF THE INVENTION

It is generally known to make paint roller covers with thermoplastic cores. Making the cores out of a thermoplastic material has the advantage that the cores will not delaminate even after prolonged soaking as is the case with most cardboard cores. However, there may still be a problem with the roller fabric prematurely separating from thermoplastic cores, either because the adhesive does not provide a very effective bond between the fabric backing and cores, or the adhesive does not hold up after prolonged soaking in certain types of solvents.

SUMMARY OF THE INVENTION

The present invention relates to methods and apparatus for making paint roller covers which are completely impervious to water and most solvents, even after prolonged soaking.

In accordance with one aspect of the invention, the roller cores are made of a thermoplastic material, and the roller fabric is permanently bonded to the roller cores by means of a thermoplastic film that is completely impervious to water and most solvents, even after prolonged soaking.

In accordance with another aspect of the invention, the roller covers are made by spirally wrapping a strip of hot thermoplastic film onto an exterior surface of a thermoplastic tubular form and spirally wrapping a strip of fabric having a thermoplastic backing onto the spiral wound strip of thermoplastic film while the thermoplastic film is still sufficiently hot to cause the thermoplastic film to flow into interstices in the thermoplastic backing of the fabric and bond the fabric to the exterior surface of the tubular form.

In accordance with another aspect of the invention, a continuous strip of thermoplastic core material is spirally wrapped around a mandrel, then a hot thermoplastic film is spirally wrapped around the spirally wrapped core material, and a fabric strip is spirally wrapped around the thermoplastic film while the thermoplastic film is sufficiently hot to bond the fabric strip to the core material.

In accordance with another aspect of the invention, a spacer member is positioned between adjacent edges of each successive wrap of the core strip material around the mandrel to prevent the adjacent edges of the core strip material from overlapping each other on the mandrel thereby forming a spiral seam along the length of the core material.

In accordance with another aspect of the invention, the spacer member is free to move to a limited extent in a direction parallel to the longitudinal axis of the mandrel to compensate for slight changes in the helix angle of the spiral wrap of core strip material on the mandrel.

In accordance with another aspect of the invention, adjacent edges of the hot thermoplastic film are overlapped over the spiral seam between adjacent edges of the thermoplastic core strip material to provide enough film material to flow into the spiral seam and also into interstices in the backing of the fabric to form a strong bond between the fabric strip and core strip material along the length of the spiral seam.

In accordance with another aspect of the invention, the thermoplastic backing may include relatively long nylon or other thermoplastic filaments extending lengthwise of the fabric strip.

In accordance with another aspect of the invention, a first driven belt drivingly may engage the fabric strip to spirally advance the fabric strip and underlying core strip material along the length of the mandrel. Also, a second drive belt may drivingly engage the core strip material upstream of where the hot thermoplastic film is applied to the core strip material to assist in spirally advancing the core strip material and fabric strip along the length of the mandrel.

In accordance with another aspect of the invention, different diameter capstans may be used to drive both driven belts at different speeds to compensate for the different outer diameters of the spiral wraps of fabric strip and core strip material on the mandrel so that both driven belts spirally advance the fabric strip and core strip material at the same speed on the mandrel.

In accordance with another aspect of the invention, separate electronically coupled drives may be used to drive both driven belts to compensate for the different outer diameters of the spiral wraps of fabric strip and core strip material on the mandrel so that both driven belts spirally advance the fabric strip and core strip material at the same speed on the mandrel.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE PREFERRED EMBODIMENTS

Figures 1, 2:
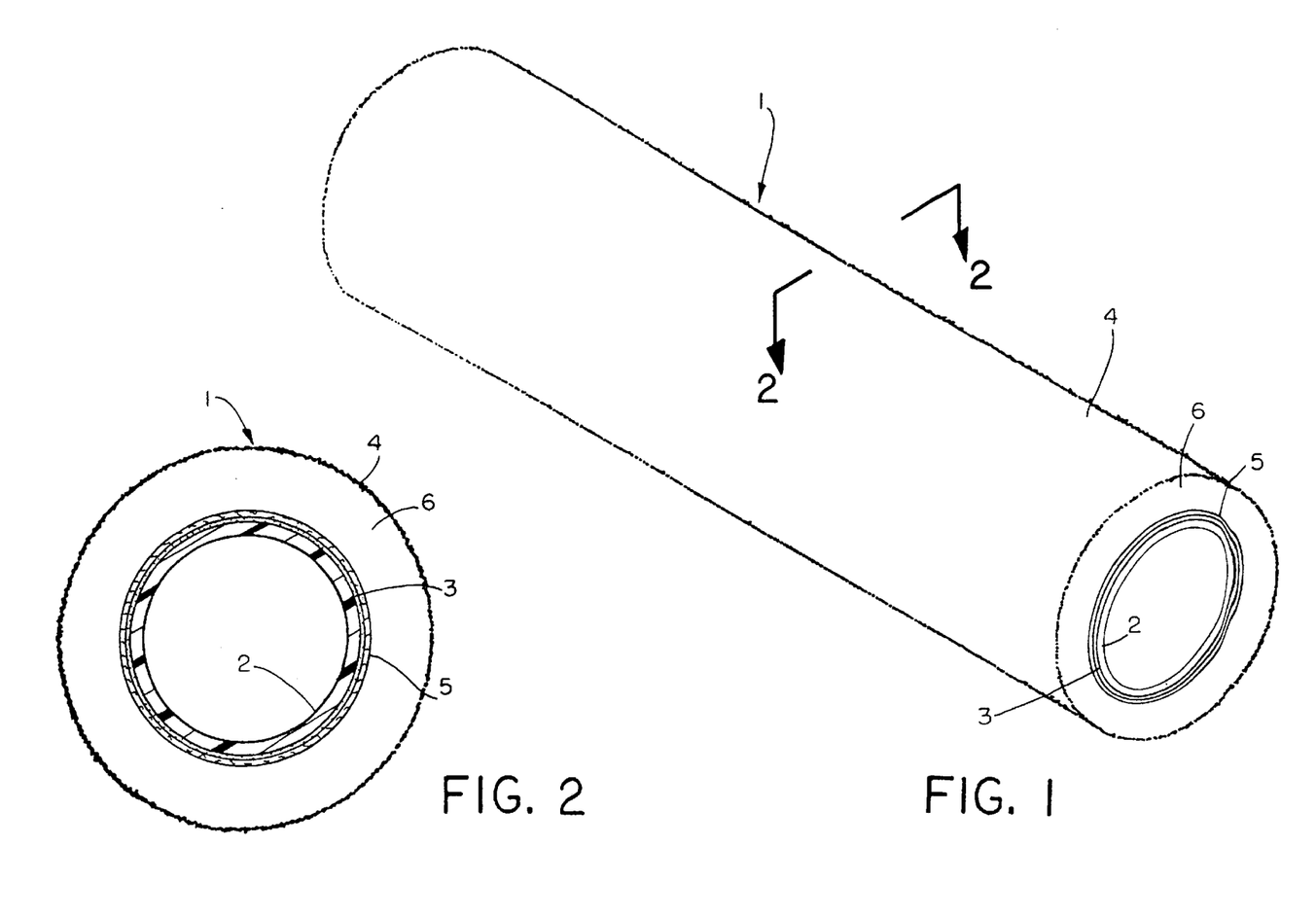
FIG. 1 is an enlarged perspective view of one form of paint roller cover made in accordance with this invention.
FIG. 2 is an enlarged transverse section through the paint roller cover of FIG. 1, taken generally along the plane of the line 2—2 thereof.

Referring now in detail to the drawings, and initially to FIGS. 1 and 2, one form of paint roller cover in accordance with this invention is generally indicated at 1 and includes a tubular thermoplastic core 2 having a uniformly thick layer of bonding film 3 on the exterior surface thereof for permanently bonding a suitable fabric 4 to the core.

The core 2 may be made of any suitable crystalline or semi-crystalline polyolefin polymer such as natural and filled polypropylene and high density polyethylene. A presently preferred polyolefin polymer is a polypropylene copolymer comprising anywhere from approximately 90 to 96% polypropylene and 4 to 10% ethylene monomer, with approximately 93% polypropylene and 7% ethylene monomer being preferred. Also, the polyolefin copolymer used for the core material desirably has a melt flow rate of between approximately 0.3 and 0.7 dg./min. Polypropylene has excellent chemical resistance to solvents and water and has an overall toughness. Ethylene monomer is added to the polypropylene in small amounts for higher impact strength, to allow the core to be subjected to low temperatures or sharp impacts without breakage, and for ease of extruding the material into the desired tubular shape and precisely cutting the tubing into the desired individual paint roller lengths.

The fabric 4 may be a conventional roller fabric that preferably has a heavy open weave thermoplastic backing 5 woven into the fabric to allow for a superior mechanical bond between the fabric backing and bonding film 3. The fabric pile or nap 6 may be made of different materials or blends and be of different heights depending on the particular application. The thermoplastic bonding film 3 should be compatible with both the core material and the fabric backing in order to achieve a permanent bond therebetween. In the case where the core material is a polypropylene copolymer, the bonding film is desirably made of polypropylene and the fabric backing is made of a suitable thermoplastic such as polyester or polypropylene. Also, the polypropylene bonding film desirably has a melt flow rate of between approximately 30 and 45 dg./min. with a melt flow rate of approximately 40 being preferred and with good melt strength, to allow the material to be extruded into a film of the desired thickness and width and spirally wrapped onto the tubular core material immediately prior to spirally wrapping the fabric onto the core material to permanently bond the fabric to the core material as described hereafter.

During the manufacturing process, hot bonding film 3 of the desired thickness and width is drawn from an extruder equipped with a coat hanger die and spirally wrapped around the extruded tubular core material 2. Within approximately one turn of wrapping the hot bonding film onto the tubular core material, a strip of the fabric material 4 having substantially the same width as the bonding film is spirally wrapped around the bonding film to permanently bond the fabric strip to the tubular core material.

In order to be able to spirally wrap the hot bonding film and fabric onto the exterior surface of the tubular core material and still maintain the desired tubular shape and integrity of the tubular core material, the tubular core material desirably has a wall thickness of between approximately 0.030 and 0.070 inch, with a thickness of approximately 0.060 inch being preferred. Also, the layer of bonding film on the tubular core material desirably has a thickness of between approximately 0.010 and 0.030 inch, with a thickness of approximately 0.020 inch being preferred, to ensure that there is enough bonding material and latent heat in the bonding material to allow the bonding material to flow into the interstices in the fabric backing and obtain the desired mechanical and chemical bond between the bonding film and fabric backing.

The first step in making paint roller covers shown in FIGS. 1 and 2 in accordance with the present invention is to provide a supply of extruded tubes 10 of the thermoplastic core material cut to the desired length, for example, 65 inches. Before the fabric material is applied to the extruded tubes, the tubes are stored in a vertical position for a minimum length of time after manufacture, for example 24 hours, to give the tubes sufficient time to normalize, crystallize, shrink and stabilize.

Figure 3:
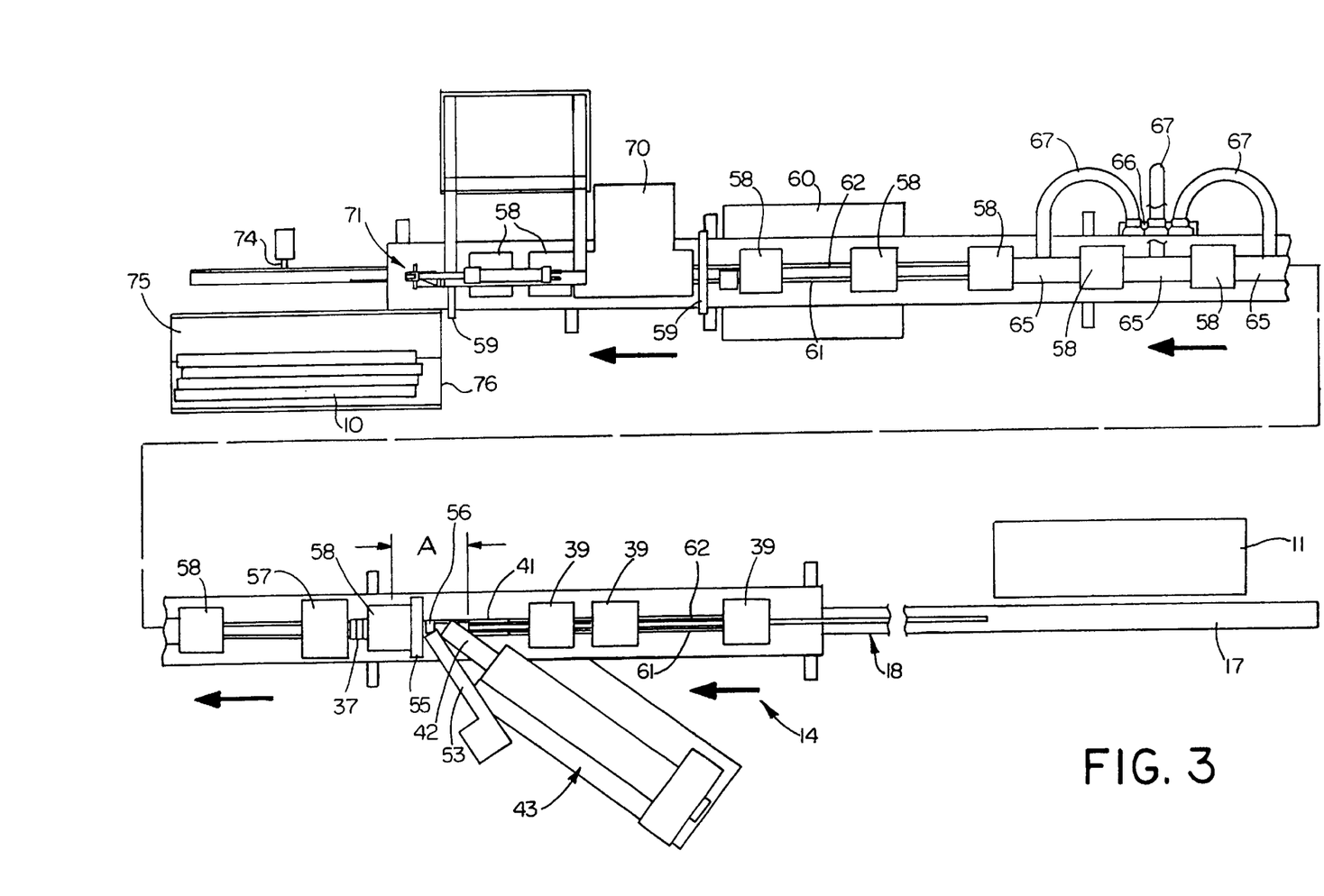
FIG. 3 is a schematic top plan view of one form of apparatus for making the paint roller covers of FIGS. 1 and 2.

After the tubes 10 have been stored for a sufficient length of time, they are loaded into a hopper 11, schematically shown in FIG. 3. Connected to the hopper 11 is a vertical conveyor 12 schematically shown in FIG. 4, for continuously feeding the tubes, one at a time, into a plastic tube spiraling machine/apparatus 14. As the tubes are continuously fed through the apparatus, the apparatus spirally wraps the bonding film and fabric onto the tubes and permanently bonds the fabric to the exterior surface of the tubes. Thereafter the fabric wrapped tubes are sufficiently cooled to permit them to be separated from each other and discharged from the apparatus as described hereafter.

The tubes 10 that are loaded into the hopper 11 are picked up by the vertical conveyor 12 (see FIG. 4) and discharged into a track 16 that feeds the tubes, one at a time, onto a trough assembly 17. From there the tubes 10 are pushed axially onto a floating tube mandrel 18 by a tube ram 19 that is movable axially along the length of the trough 17 from one end to the other.

The mandrel 18 supports the tubes 10 during the spiral wrapping of both the bonding film and fabric onto the tubes as described hereafter, and is desirably of considerable length, for example 195¼ inches, for supporting three 65 inch length tubes on the mandrel at any given time. Moreover, the mandrel desirably comprises a plurality of tubular sections made for example of extruded aluminum and suitably connected together at their ends.

Figure 4:
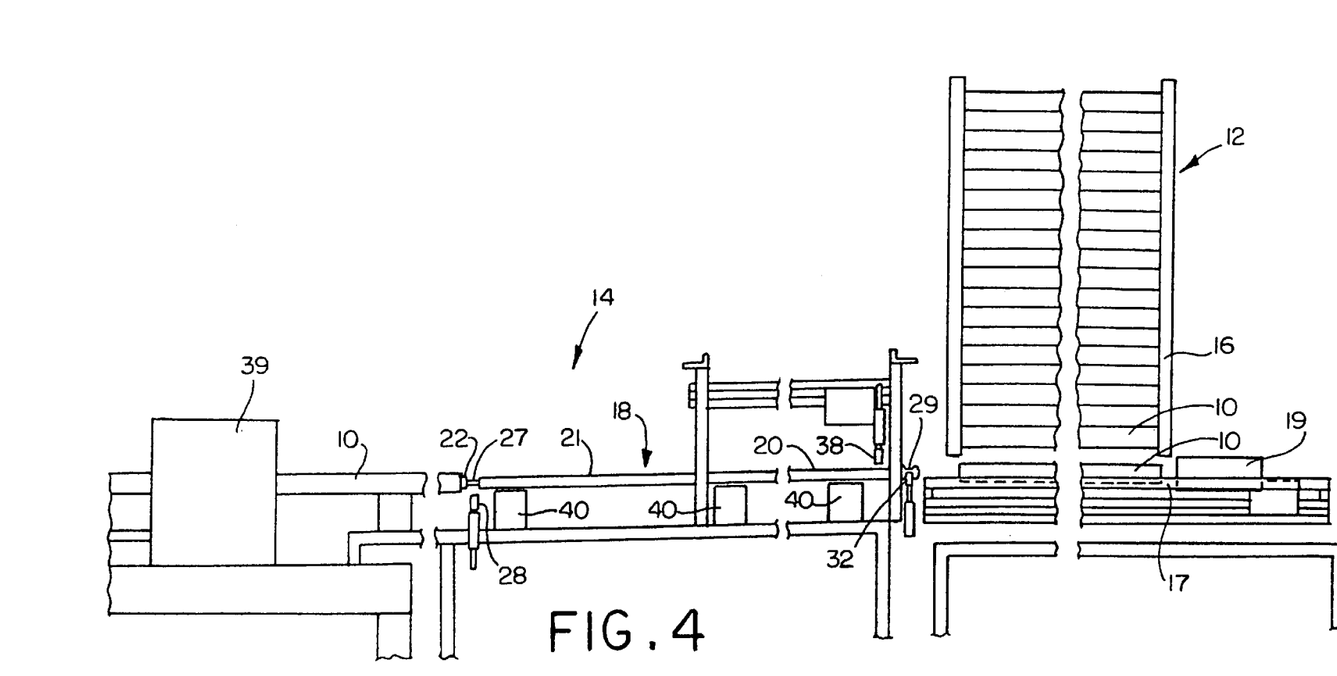
FIG. 4 is an enlarged schematic fragmentary side elevation view of the automatic tube feed mechanism of the apparatus of FIG. 3.
Figure 5:
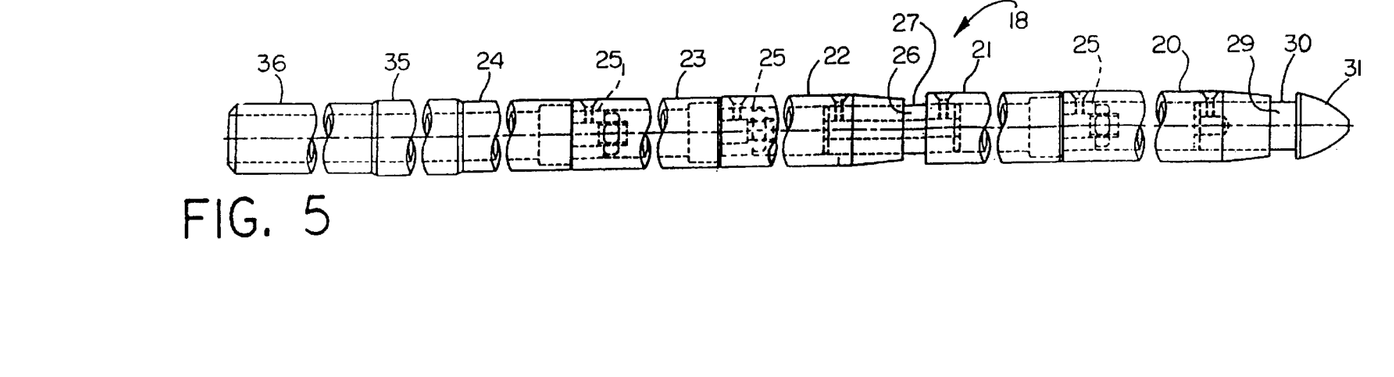
FIG. 5 is an enlarged fragmentary side elevation view of the mandrel used in such apparatus.

In the preferred embodiment shown in FIGS. 3–6, the mandrel 18 is made up of five sections 20–24 (see FIG. 5). The first two sections 20 and 21 (as viewed from the upstream end of the apparatus in the direction of the downstream end) have a length of approximately 37⅛ inches and 30⅜ inches, respectively (for a combined length of approximately 67½ inches), and are connected together at their ends by a bearing sleeve 25 that permits relative rotation between sections. The third section 22 has a length of approximately 33¾ inches and is connected to the second section 21 by a connector plug 26 that defines a notch or groove 27 between such sections for releasable engagement by a mandrel stop 28 (see FIG. 4) which when engaged prevents axial movement of the mandrel.

A similar notch or groove 29 is formed by the shaft 30 of a tube guide 31 extending into the upstream end of the first mandrel section 20 for releasable engagement by another mandrel stop 32.

The fourth and fifth mandrel sections 23 and 24 are each approximately 45¾ and 48¼ inches long, respectively, and are connected together and to the third section 22 by bearing sleeves 25 to provide rotatable connections therebetween, similar to the rotatable connection between the first two sections 20, 21.

The mandrel 18 terminates immediately downstream of the zone A (see FIG. 3) of the apparatus 14 at which the bonding film 3 and fabric 4 are spirally wrapped onto the tubing 10. Moreover, the mandrel 18 desirably includes a stepped portion 35 in this zone or area A having a greater outer diameter than the remaining length of the mandrel to bring the mandrel to a size that more closely matches the inner diameter of the tubes to provide better support for the tubes at the critical point where the bonding film and fabric are applied to the tubes. This stepped portion 35 of the mandrel may, for example, have an outer diameter of approximately 1.473 inches where the inner diameter of the raw tubes 10 is approximately 1.5 inches and an axial length of approximately 13 inches. The outer diameter of the remaining length of the mandrel including a 6 inch length 36 at the downstream-most end of the mandrel is desirably somewhat less, for example, approximately 1.437 inches, to provide a greater clearance between the outer diameter of the mandrel and inner diameter of the tubes over the majority of the length of the mandrel to reduce the drag on the tubes when the tubes are driven both rotationally and axially relative to the mandrel by planetary drive assemblies as described hereafter.

In order to be able to push the tubes 10 onto the first two mandrel sections 20, 21 by the tube ram 19, the upstream mandrel stop 32 must be disengaged from the mandrel 18 so as not to interfere with the tube movement onto such mandrel sections. At the same time, the downstream mandrel stop 28 should engage the mandrel to prevent the mandrel from moving axially. If the two mandrel stops 28, 32 should ever be simultaneously disengaged from the mandrel, the mandrel may start to travel down the line, in which event a metal detector 37 located immediately downstream of the bonding film and fabric application zone A (see FIG. 3) will sense the mandrel movement and automatically shut the apparatus down to prevent any damage to the apparatus further downstream of the metal detector.

Once a tube 10 is slid into place on the first two mandrel sections 20, 21, the upstream mandrel stop 32 is engaged and the downstream mandrel stop 28 is disengaged to permit a tube stripper 38 to engage the trailing (upstream) end of the tube and push the tube axially downstream onto the third mandrel section 22 where the tube is engaged by one of several planetary drive assemblies 39 that propel the tubes both axially and rotationally through the apparatus.

After the trailing end of a tube 10 clears the downstream mandrel stop 28, the downstream mandrel stop 28 is reengaged and the upstream mandrel stop 32 is disengaged to permit the next tube 10 to be pushed onto the first two mandrel sections 20, 21. Thereafter the upstream mandrel stop 32 is reengaged and the downstream mandrel stop 28 is disengaged to permit the next length of tube to be pushed onto the third mandrel section 22 and into abutting engagement with the trailing end of the previous tube, and so on. Two such tubes 10 are schematically shown in butting end to end engagement with each other in FIG. 6.

A plurality of axially spaced apart tube support rollers 40 support the mandrel sections 20, 21 and 22 and surrounding tubes 10 upstream of the first planetary drive assembly 39 (see FIG. 4).

Figure 6:
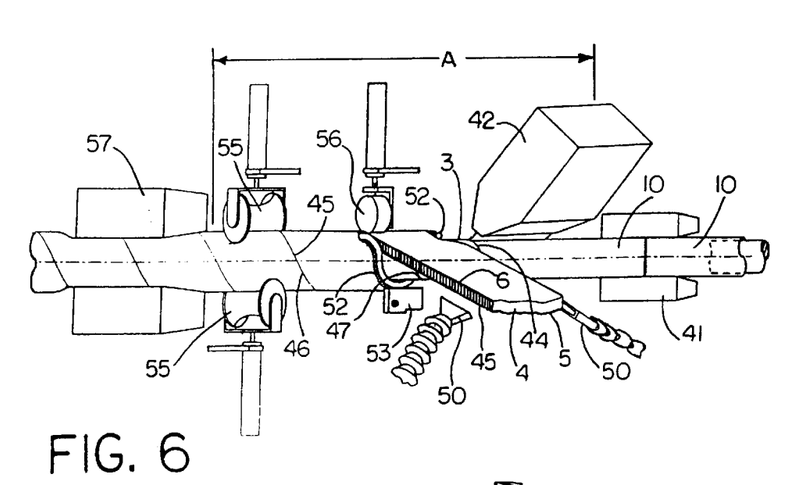
FIG. 6 is an enlarged schematic side elevation view of the portion of the apparatus of FIG. 3 at which the bonding film and fabric are spirally wrapped onto the tubular core material.

Immediately upstream of the fabric and bonding film application zone A are a series of alignment rollers 41 through which the tubing passes just prior to spirally wrapping the bonding film and fabric strip material onto the tubing (see FIGS. 3 and 6). As the rotating and axially advancing tubing passes through the fabric and bonding film application zone A, hot bonding film 3 is laid down on the exterior surface of the tubing at a desired helix angle by the die head 42 of an extruder 43 equipped with a coat hanger die as aforesaid. The axial and rotational movement of the tubing causes the bonding film 3 to be spirally wrapped onto the tubing with the side edges 44 of the bonding film in close butting engagement with each other (see FIG. 6) while a constant tension applied to the bonding film to obtain the desired uniform thickness and width of bonding film on the tubing.

Within approximately the next turn of the bonding film, a fabric strip 4 having substantially the same width as the bonding film is spirally wrapped onto the bonding film at substantially the same helix angle as the bonding film and with the side edges 45 of the fabric strip also in close abutting engagement with each other.

In one form of the invention, where the tubing 10 is extruded out of a polypropylene copolymer having an inner diameter of approximately 1.5 inch and a wall thickness of approximately 0.060 inch, and the fabric strip 4 has a width of approximately 2⅞ inches and a heavy open weave backing 5 made of a compatible thermoplastic material, a polypropylene bonding film 3 is drawn down from a width of approximately 4 inches and a thickness of approximately 0.057 inch at the extruder die opening to a width of approximately 2¾ inches and film thickness of approximately 0.020 inch as the bonding film is spirally wrapped onto the tubing. When the bonding film comes into contact with the tubing and as the fabric is spirally wrapped around the bonding film, the bonding film is still at a relatively high temperature, for example, between approximately 475° and 500° F. At this temperature, the latent heat in the bonding film is sufficient to cause the bonding film to flow into the interstices in the fabric backing and permanently bond the fabric to the tubing. Preferably, the fabric seams 46 are located between the bonding film seams 47 when the fabric is spirally wrapped onto the tubing.

The fabric 4 comes in various lengths, for example, 100 feet lengths. Accordingly, the ends of the fabric must be spliced together in order to provide a continuous supply of fabric to the tubing as the tubing is continuously advanced through the apparatus. As the fabric is spirally wrapped around the tubing/bonding film, a predetermined amount of tension is maintained on the fabric to ensure that the fabric is tightly wrapped around the tubing and the bonding film flows into the interstices in the fabric backing to provide a permanent bond between the fabric and tubing.

Air nozzles 50 (see FIG. 6) located adjacent the side edges of the fabric direct a flow of air against the fabric side edges to cause the fabric pile/nap 6 to stand up along the side edges. In addition, a helically shaped fabric guide 52 extends approximately 360° around the tubing at the same helix angle as the fabric edge and picks up the fabric pile/nap 6 on the entry/upstream side and terminates at the butt joint where the fabric edges come together. This helps to form the fabric into the desired curl with the edges of the fabric pile/nap standing up so the pile/nap does not get caught between or underneath the abutting fabric edges. The helical fabric guide 52 is supported by a mounting bracket 53 connected to the fabric guide on the underneath side thereof as schematically shown in FIG. 6.

A set of elliptically shaped rollers 55, which may either be spring or air operated, is located immediately downstream of where the fabric is spirally wrapped onto the tubing to apply a preset pressure across the entire width of the fabric to ensure an even, uniform adherence of the fabric to the tubing over substantially the entire surface area of the fabric. A third roller 56, which may also be air or spring actuated, is positioned right where the fabric seam 46 initially comes together to ensure uniform adherence of the fabric to the tubing along the fabric seam. This has the benefit that when the tubing is subsequently cut into individual paint roller lengths, if a cut should occur across a fabric seam, the edge of the fabric will not pull away from the tubing.

As previously indicated, the tubing is internally supported by the enlarged diameter stepped portion 35 of the mandrel 18 during the spiral wrapping of both the hot bonding film 3 and fabric 4 onto the tubing. Also, the spiral wrapped tubing is internally supported by the mandrel during the application of a preset pressure to the fabric by the seam roller 56 and elliptical rollers 55 immediately after the fabric is wrapped onto the tubing.

Beyond that point, the fabric covered tubing is no longer internally supported. Instead, the fabric covered tubing is only supported on the exterior by additional planetary drive assemblies 58 and roller guide assemblies 59 strategically located along the length of the apparatus downstream of the pressure rollers 55. In addition, a set of alignment rollers 57 for the fabric covered tubing are positioned downstream of the pressure rollers 55 which cooperate with the tube alignment rollers 41 immediately upstream of where the bonding film and fabric are spirally wrapped onto the tubing to assist in maintaining proper alignment of the tubing during application of the bonding film and fabric to the tubing.

All of the planetary drive assemblies 39 and 58 (i.e., those downstream of where the bonding film and fabric are applied to the tubing as well as those upstream thereof) are driven from a common power supply unit 60 by two input shafts 61, 62 (see FIG. 3), one of which controls the axial speed of the tubing, and the other of which controls the rotational speed. The ratio of these two speeds defines the helix angle at which the fabric (as well as-the bonding film) is wrapped onto the tubing, which is critical in producing a good butt joint between adjacent fabric wraps. Should a gap start to develop between adjacent fabric wraps, this can be corrected simply by changing one of the speeds of the two input shafts 61, 62 to close the helix angle. Conversely, should an overlap start to develop between adjacent fabric wraps, this can be corrected by changing one of the speeds of the two input shafts 61, 62 to open the helix angle.

The planetary drive assemblies 58 downstream of where the bonding film and fabric are applied to the tubing may be substantially the same as the upstream planetary drive assemblies 39 except that the upstream planetary drive assemblies 39 include three sets of tires which engage the exterior surface of the tubing and propel the tubing both axially and rotationally, whereas the downstream planetary drive assemblies 58 include three sets of pinwheels which grip the fabric to propel the tubing both axially and rotationally.

After the fabric strip has been spirally wrapped and rolled onto the tubing, the temperature of the fabric covered tubing is still relatively hot, in the range of 350 to 400° F., which is too hot to separate the tubes 10 from each other by cutting through the fabric at the ends of the tubes. Preferably the tubes are cooled down to a temperature of no more than approximately 200° F. before the tubes are cut apart. Thus, it is important to cool the tubes down as rapidly as possible after the fabric strip is adhered to the tubes to maximize the production output of the apparatus.

In the form of the invention shown in FIGS. 1–7, cooling of the fabric covered tubing is accelerated by supplying cool/air conditioned air to one or more manifolds 65 located between various planetary drive assemblies 58 downstream of where the fabric is applied to the tubing as schematically shown in FIG. 3. One or more air conditioning units 66 may be used to supply cool air through air ducts 67 to the same or different manifolds 65 as desired. The ends of the manifolds 65 are of course open to allow for unobstructed movement of the fabric covered tubing through the manifolds.

After the fabric covered tubing is sufficiently cooled, the tubing passes through a cutter assembly 70 (see FIGS. 3 and 7) that moves axially at the same lineal speed as the tubing for a very short distance, for example, approximately 1 inch, while making a cut through the fabric between the ends of the tubes.

Figure 7:
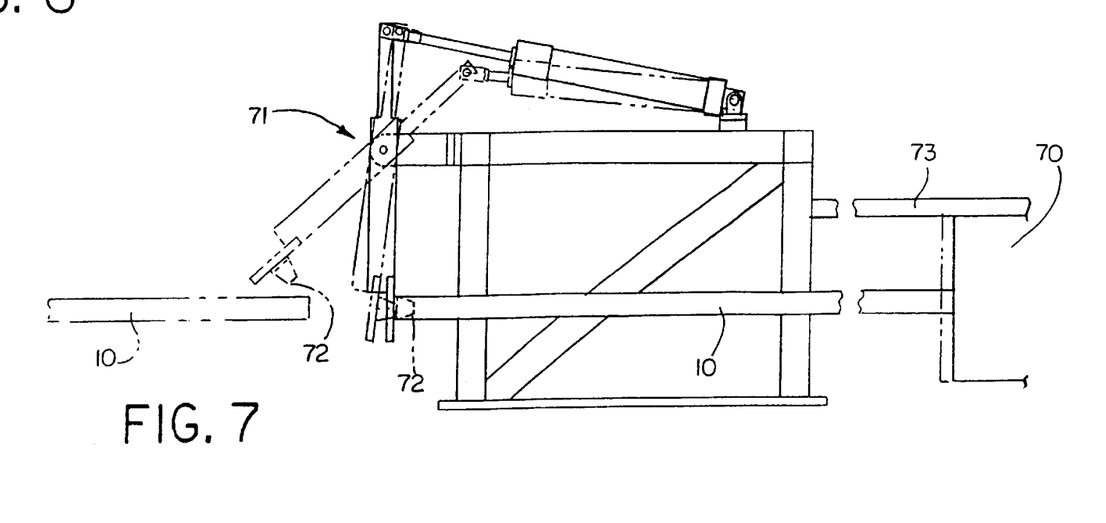
FIG. 7 is an enlarged schematic side elevation view of the cutter assembly and dead stop of such apparatus.

Operation of the cutter assembly 70 is controlled by a dead stop 71 which, as best seen in FIG. 7, includes a target 72 in coaxial alignment with the tubing downstream of the cutter assembly. The target 72 is spaced from the cutter mechanism 70 a distance corresponding to each individual length of tubing 10 (in this case 65 inches). Accordingly, when the downstream-most end of the tubing engages the target 72, both the dead stop 71 and cutter mechanism 70 which is tied to the dead stop through a tie rod assembly 73, are caused to move a very short distance, for example approximately 1 inch, during which the cutter blades move radially inward to cut through the fabric between a pair of tube ends.

After the dead stop 71 moves the short distance required for the cutter mechanism 70 to cut through the fabric between a pair of tube ends, the target 72 pivots out of the way above the tube that was just separated from the remaining tubing as schematically shown in phantom lines in FIG. 7 to permit the leading end of the separated tube to move past the target to the position also shown in phantom lines in FIG. 7 where the tube is free to be pushed sideways by an air actuated push rod 74 to cause the tube to be discharged down a chute 75 into a discharge hopper 76 (see FIG. 3).

As soon as the target 72 pivots out of the way, both the dead stop 71 and cutoff mechanism 70 move back to their original starting positions shown in solid lines in FIG. 7. Also, as soon as the separated tube 10 has been discharged onto the discharge chute 75, the target 72 repositions itself for reengagement by the leading end of the next length of tubing and the cutting cycle is repeated.

While the lengths of tubes 10 are in the discharge hopper 76, both ends of the tubes may be inspected for any possible types of defects. Following inspection, the tubes are taken out of the hopper and stacked on end until the fabric covered tubes are uniformly cooled throughout their length. It is important to cool the tubes at a uniform rate over their entire length while the tubes are standing on end to ensure that the tubes stay round during cooling. The tubes are desirably stood on end for a day or two to allow the tubular core material to crystallize for strength before the tubes are cut into individual paint rollers having a length for example of nine inches.

Figure 8:
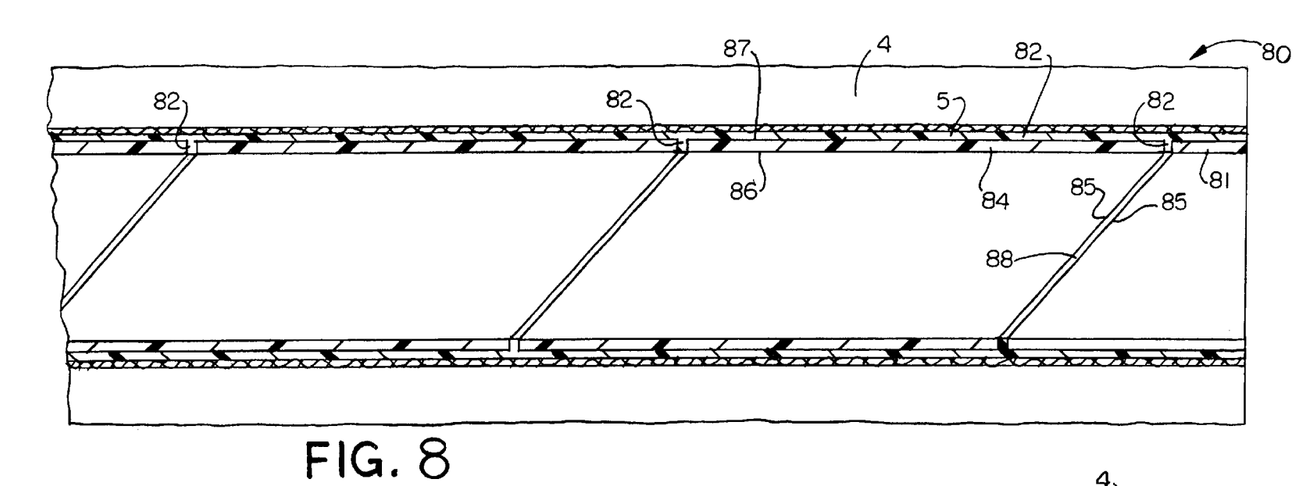
FIG. 8 is an enlarged fragmentary longitudinal section through another form of paint roller cover made in accordance with this invention.

FIG. 8 is an enlarged fragmentary longitudinal section through another form of paint roller cover 80 in accordance with this invention which, like the paint roller cover 1 shown in FIGS. 1 and 2, includes a thermoplastic core 81 having an adhesive bonding film 82 on the exterior surface thereof for permanently bonding a suitable fabric 4 to the core. However, in the manufacture of paint roller covers 80 of the type shown in FIG. 8, instead of using extruded tubes for the core as in the FIGS. 1 and 2 embodiment, the core 81 is formed by spirally wrapping a single continuous strip or ply 84 of thermoplastic core material, preferably polypropylene, around a stationary mandrel with the adjacent edges 85 of the core strip 84 in closely spaced but non-overlapping relation to each other as described hereafter.

It is important that the edges 85 of the single ply core strip material 84 not overlap each other, since overlapping edges would produce an uneven inner core surface 86 making it difficult to support the paint roller cover internally on a roller frame. Also overlapping core strip edges would produce an uneven outer core surface 87 resulting in uneven application of paint when the roller cover 80 is rolled on a surface such as a wall or ceiling.

By the same token, it is important that not too much of a gap 88 be left between the core strip edges 85 during the roller cover manufacturing process, since too wide a gap could adversely affect the structural integrity of the core and greatly reduce the crush strength of the roller cover 80.

To prevent adjacent edges 85 of the core strip material 84 from overlapping each other during the manufacturing process but still ensure the structural integrity of the core 81 so the roller cover 80 has good crush strength when a rolling force is applied to the roller cover during application of paint or other liquid coating to a wall or other surface, a gap 88 preferably of no more than 0.050 inch and more preferably within the range of 0.010 inch to 0.015 inch is maintained between the core strip edges during the roller cover manufacturing process. This may be accomplished in accordance with the present invention by positioning a core strip edge tracking spacer or stylus 90 between adjacent edges 85 of each successive wrap 91 of the core strip material 84 around a stationary mandrel 92 of a roller cover manufacturing apparatus 93 to maintain a minimum gap 88 between the core strip edges as schematically shown in FIGS. 9 and 10.

Figures 10, 11:
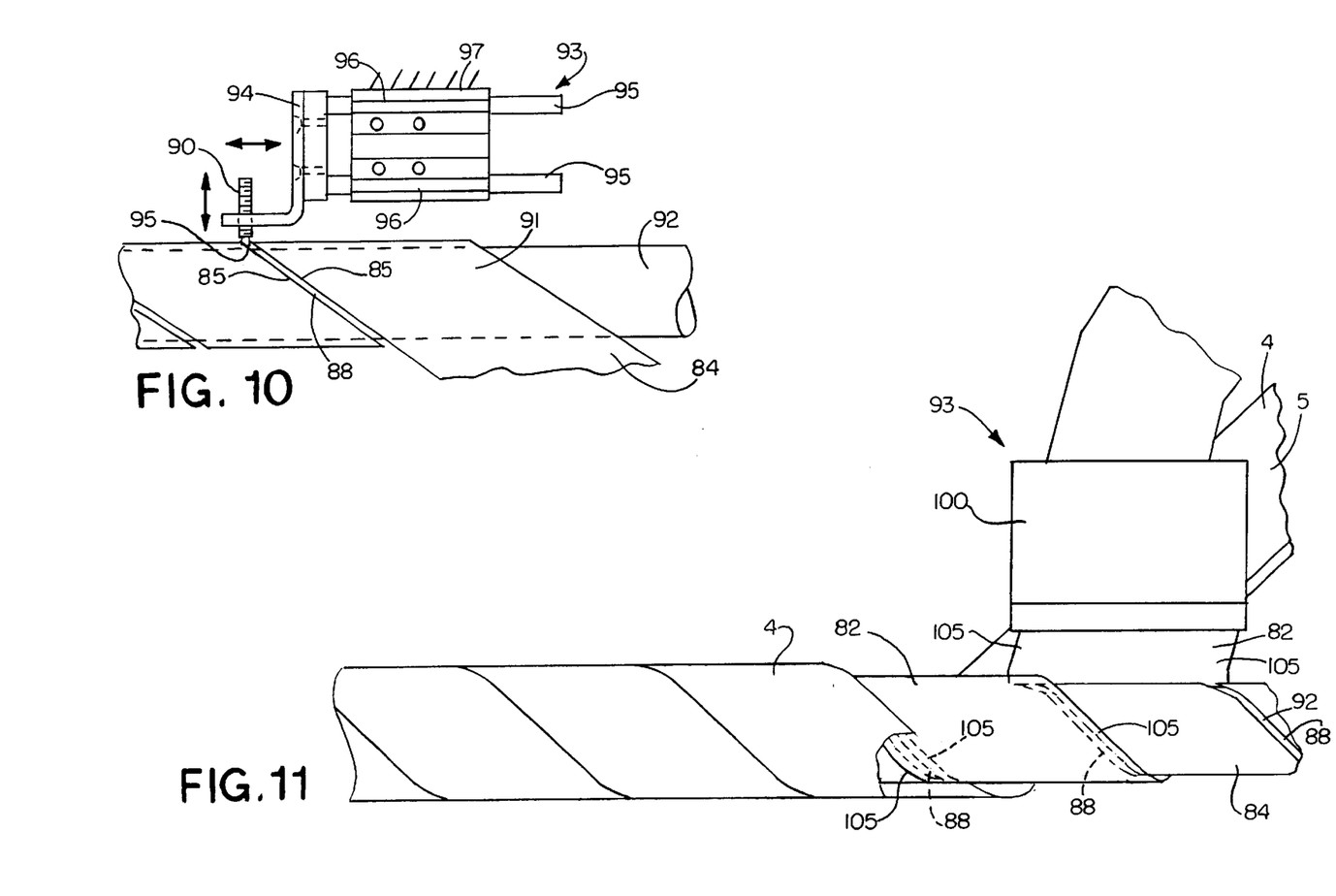
FIG. 10 is an enlarged schematic top plan view of the core strip edge spacer of the apparatus of FIG. 9 which prevents the adjacent core strip edges from overlapping each other during spiral wrapping of the core strip material onto the mandrel.
FIG. 11 is an enlarged schematic top plan view of a portion of the apparatus of FIG. 9 showing the hot thermoplastic film being drawn from an extruder die head and spirally wrapped around the outer surface of the spirally wrapped core strip material with the adjacent edges of the hot thermoplastic film overlapping each other over the spiral seam of the core strip material.

The spacer 90 may be a relatively thin cylindrical pin or blade of the requisite diameter or thickness, and is supported adjacent the outer diameter of the mandrel 92 10 as by means of an angle bracket 94 that maintains a clearance space of for example 0.005 inch to 0.008 inch between the tip 95 of the spacer and the outer diameter of the mandrel (see FIG. 10). If desired, the spacer 90 may also be threadedly connected to the angle bracket 94 to permit limited movement of the spacer toward and away from the exterior surface of the mandrel to adjust the clearance space therebetween.

To ensure that the spacer 90 will follow or track along between the adjacent core strip edges 85 and compensate for any slight changes in the helix angle of the spiral wrap of core strip material around the mandrel, the spacer mounting bracket 94 is supported as by means of a pair of guide rods 95 slidably received in guides 96 in a fixed support 97. This allows the spacer to freely float or move in a linear direction parallel to the axis of the mandrel a limited distance, for example, approximately 1½ inches.

Figure 9:
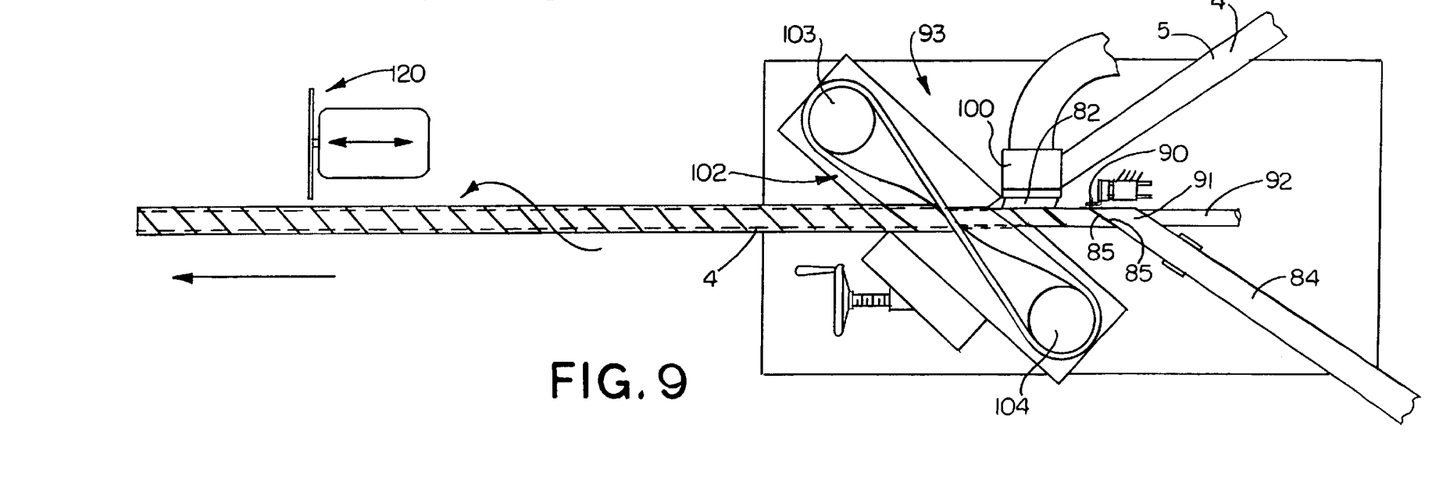
FIG. 9 is a schematic top plan view of another form of apparatus for making the paint roller covers of FIG. 8.

During startup of the paint roller 80 manufacturing process schematically shown in FIG. 9, a single strip 84 of thermoplastic core material, preferably polypropylene, of the desired width and thickness, is fed over the stationary mandrel 92 from one side at a desired helix angle. Then a sufficient number of turns of the core strip material are manually wrapped around the mandrel to extend beyond the core strip edge spacer 90 and an extruder die head 100 for the hot thermoplastic bonding film 82 a sufficient distance to allow the fabric strip material 4 to be subsequently manually wrapped around the leading end of the core strip material 84 at the same helix angle. The fabric strip 4 is preferably fed under the mandrel 92 from the other side with the fabric backing side 5 up and is manually wrapped around the mandrel a sufficient distance to allow a belt drive 102 to be tightly wrapped about the fabric strip on the mandrel. Belt drive 102, when driven by driving one of two rollers 103, 104 about which the belt drive is also wrapped, will cause the fabric and core strips 4 and 84 to spirally advance along the mandrel 92 in a manner well known in the art.

Since the extruder die head 100 is also shown located on the other side of the mandrel 92 from the core strip 84, the extruder die head will feed the hot thermoplastic bonding film 82 under the mandrel and onto the core strip material immediately upstream of the point at which the fabric strip 4 is spirally wrapped around the core strip material.

Fabric strip 4 may have a width substantially the same as the core strip material 84. By contrast, the bonding film 82 desirably has a width somewhat greater than the core strip material to allow the adjacent edges 105 of the bonding film to be overlapped outwardly of the spiral gap or seam 88 that is formed between the adjacent edges of the spiral wrapped core strip material as schematically shown in FIG. 11. This provides additional bonding film 82 over the spiral seam 88 for flow of the bonding film into the spiral seam as schematically shown in FIG. 8 as well as into the interstices in the fabric backing 5 to form a relatively strong joint over the spiral seam.

Figure 13:
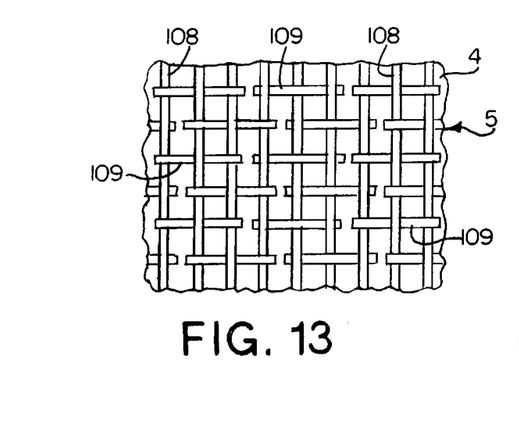
FIG. 13 is an enlarged fragmentary schematic plan view of the woven backing of one form of fabric strip used to make roller covers in accordance with this invention.

Typically the fabric 4 used to make roller covers with thermoplastic cores has a backing 5 made of woven polyester filaments that are relatively short both widthwise and lengthwise of the fabric. However, the fabric 4 used to make the roller covers 80 shown in FIG. 8 preferably has a fabric backing 5 made of relatively long thermoplastic filaments 108, preferably nylon, running along the length of the fabric strip and relatively short polyester or other thermoplastic filaments 109 running across the width of the fabric strip as schematically shown in FIG. 13. The nylon filaments 108 are much stronger than the polyester filaments 109 and are of a much greater length, which greatly increases the strength of the fabric backing, preventing the fabric backing from tearing along the seam line 88 of the spiral wound core 81.

Figure 12:
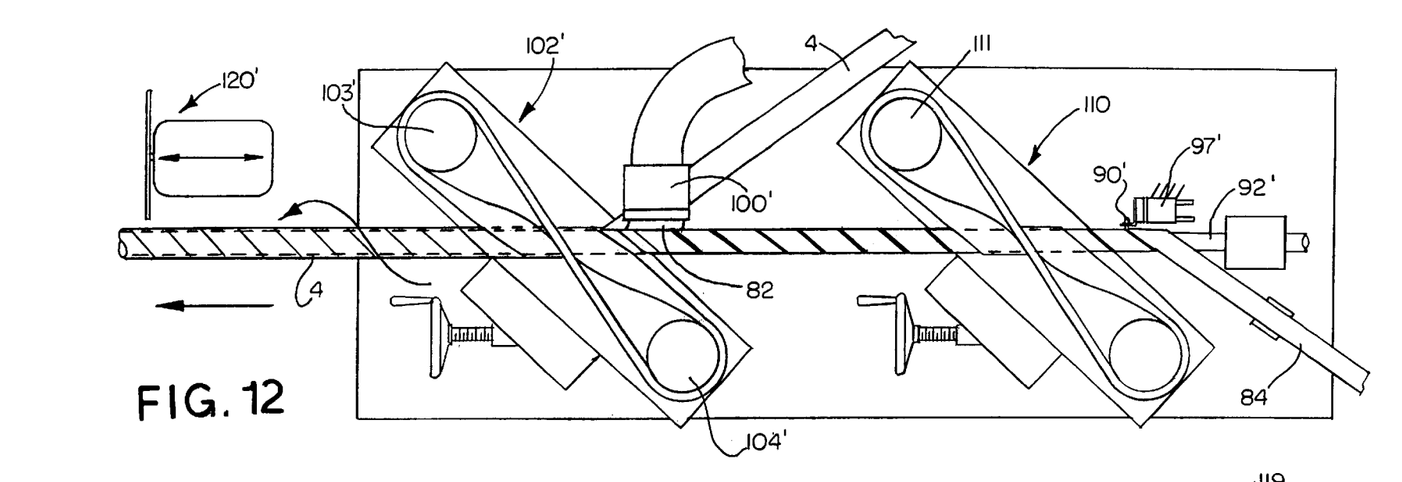
FIG. 12 is a schematic top plan view of a modified form of the apparatus of FIG. 9 which includes the same driven belt for drivingly engaging the fabric strip and a second driven belt for drivingly engaging the core strip material upstream of the extruder die head.

FIG. 12 shows a modified form of apparatus 93' for making the roller cover 80 of FIG. 8 which is substantially the same as that shown in FIGS. 9 through 11. Accordingly, the same reference numbers followed by a prime symbol (') are used to designate like parts. The apparatus 93' shown in FIG. 12 differs from that shown in FIGS. 9–11 in that a second belt drive 110 is provided between the spacer mechanism 90' and extrusion die head 100' for directly driving the core strip material 84 to assist in advancing the core strip material and fabric strip 4 along the mandrel 92'. This second belt drive 110 is particularly helpful in providing better control of the movement of the core strip material and fabric strip along the mandrel especially when using relatively high pile fabrics.

Figure 14:
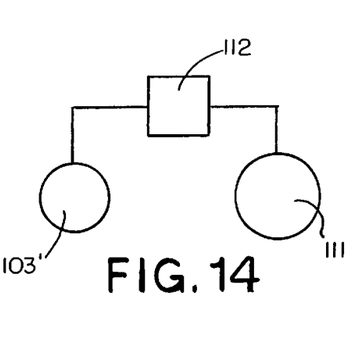
FIGS. 14 and 15 schematically show two different drives for driving two belt drives at different speeds to compensate for the different outer diameters of core strip material and high pile fabric strip driven thereby.
Figure 15:
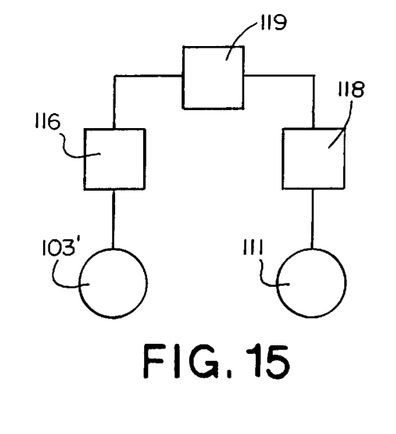

The different outer diameters of the core strip material 84 and high pile fabric strip 4 on the mandrel 92' can be compensated for as by making the drive capstan 111 for the core strip material belt drive 110 somewhat larger in diameter than the capstan 103' for the fabric belt drive 102' so the core strip material and fabric can be driven by a common drive motor 112 at the same speed as schematically shown in FIG. 14. Alternatively, two separate drive motors 116, 118 may be tied together electronically through a suitable controller 119 for driving respective capstans 103' and 111 of the same diameter to synchronize or match the speeds of the core strip material and fabric on the mandrel.

The belt drive 102', which drivingly engages the fabric strip 4 immediately downstream of where the fabric strip is spirally wrapped around the bonding film 82, applies a uniform pressure to the outer surface of the fabric as the fabric passes through the belt drive 102 to ensure an even, uniform adherence of the fabric to the core strip material over substantially the entire surface area of the fabric.

During manufacture of the roller cover 80 shown in FIG. 8, bonding film 82 is only applied to the core strip material 84 after the core strip material has been wound onto the mandrel 92 or 92' and just before the fabric strip is wound around the bonding film. Thus, the entire roller cover 80 is formed in a single step as the fabric is spirally wrapped about the bonding film. This eliminates the need to provide a completely formed core before applying the bonding film and fabric to the core strip material.

The core strip material 84 is internally supported by the stationary mandrel 92 or 92' during the entire roller cover manufacturing process up until the time the fabric covered core strip material is sufficiently cooled and cut to the desired length, for example, 65 inches, using a flying shear 120 or 120' (see FIGS. 9 and 12). Thereafter the fabric covered core strip material is removed from the outboard end of the mandrel for further finishing into individual paint roller covers having a length for example of 7 or 9 inches, in a manner well known in the art.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A method of making roller covers comprising the steps of spirally wrapping a hot thermoplastic film around a thermoplastic tubular form, and spirally wrapping a fabric strip around the thermoplastic film while the thermoplastic film is sufficiently hot to cause the thermoplastic film to bond the fabric strip to the tubular form.

2. The method of claim 1 further comprising the step of separating the fabric covered tubular form into a plurality of individual lengths of fabric covered tubing.

3. The method of claim 1 wherein a strip of the hot thermoplastic film is continuously extruded directly onto the tubular form.

4. The method of claim 1 wherein the tubular form is comprised of a plurality of preformed individual tubes each having a length which is a multiple of the length of individual roller covers to be subsequently cut therefrom, further comprising the steps of butting the ends of the individual tubes together prior to wrapping the thermoplastic film and fabric strip around the individual tubes, and subsequently cutting through the fabric between the ends of the individual lengths of fabric covered tubes to separate the individual lengths of fabric covered tubes from each other.

5. The method of claim 1 wherein the tubular form is formed by spirally wrapping a continuous length of thermoplastic core strip material around a mandrel before the hot thermoplastic film is spirally wrapped around the tubular form.

6. The method of claim 5 wherein adjacent edges of the core strip material are maintained in closely spaced, non-overlapping relation during the spiral wrapping of the core strip material around the mandrel to form a spiral seam between such core strip edges.

7. The method of claim 5 wherein a spacer is positioned between adjacent edges of each successive wrap of the core strip material around the mandrel to prevent adjacent edges of the strip material from overlapping each other during the spiral wrapping of the core strip material around the mandrel.

8. The method of claim 6 wherein the hot thermoplastic film is continuously spirally wrapped around the tubular form with adjacent edges of the hot thermoplastic film overlapping each other over the spiral seam between the adjacent edges of the core strip material.

9. The method of claim 8 wherein the fabric strip has a thermoplastic backing containing interstices into which the hot thermoplastic film flows during spiral wrapping of the fabric strip around the thermoplastic film to bond the fabric strip to the tubular form.

10. The method of claim 9 wherein the thermoplastic backing is comprised of relatively long thermoplastic filaments extending along the length of the fabric strip for increased strength, preventing the fabric backing from tearing at the spiral seam of the tubular form.

11. The method of claim 10 wherein the long thermoplastic filaments are made of nylon and the thermoplastic backing also includes relatively short thermoplastic cross filaments.

12. The method of claim 7 wherein the spacer maintains a gap of no more than 0.050 inch between the adjacent edges of the core strip material during the spiral wrapping of the core strip material around the mandrel.

13. The method of claim 7 wherein the spacer maintains a gap of no more than 0.015 inch between the adjacent edges of the core strip material during the spiral wrapping of the core strip material around the mandrel.

14. The method of claim 7 wherein the spacer maintains a gap of between approximately 0.010 inch and 0.015 inch between the adjacent edges of the core strip material during the spiral wrapping of the core strip material around the mandrel.

15. The method of claim 7 wherein the spacer is free to move to a limited extent in a direction parallel to the longitudinal axis of the mandrel to permit the spacer to track between the adjacent edges of the core strip material during the spiral wrapping of the core strip material around the mandrel and compensate for any slight changes in the helix angle of the spiral wrap of core strip material around the mandrel.

16. The method of claim 7 wherein the spacer is supported by guides that permit limited movement of the spacer in a linear direction parallel to the longitudinal axis of the mandrel.

17. The method of claim 7 wherein the spacer has a tip that is maintained in closely spaced relation to the outer diameter of the mandrel during the spiral wrapping of the core strip material around the mandrel.

18. The method of claim 17 wherein the spacer is movable toward and away from the mandrel to adjust the clearance space between the tip of the spacer and the outer diameter of the mandrel.

19. The method of claim 17 wherein the clearance space between the tip of the spacer and the outer diameter of the mandrel is set to be between approximately 0.005 inch and 0.008 inch.

20. A method of making roller covers comprising the steps of spirally wrapping a continuous length of thermoplastic core strip material around a mandrel while positioning a spacer between adjacent edges of each successive wrap of the core strip material around the mandrel to prevent such adjacent edges of the core strip material from overlapping each other on the mandrel thus forming a spiral seam between the adjacent edges of the core strip material, applying a layer of adhesive on the spirally wrapped core strip material, and spirally wrapping a fabric strip over the adhesive layer to bond the fabric strip to the core strip material.

21. The method of claim 20 wherein the adhesive is a thermoplastic material that is sufficiently hot when the fabric strip is spirally wrapped over the adhesive layer to bond the fabric strip to the core strip material upon cooling of the thermoplastic material.

22. The method of claim 20 wherein a hot thermoplastic film of the adhesive is spirally wrapped around the outer surface of the spirally wrapped core strip material immediately prior to spirally wrapping the fabric strip over the adhesive film.

23. The method of claim 22 wherein the fabric strip has a thermoplastic backing containing interstices into which the hot thermoplastic film flows to form a mechanical bond between the fabric strip and the core strip material.

24. The method of claim 23 wherein adjacent edges of the hot thermoplastic film are overlapped over the spiral seam between the adjacent edges of the core strip material to provide additional adhesive at the spiral seam for flow into the spiral seam and into the interstices in the fabric backing outwardly of the spiral seam.

25. The method of claim 20 wherein a first belt drive drivingly engages the fabric strip material on the mandrel to spirally advance the fabric strip material and underlying core strip material along the length of the mandrel, and a second belt drive drivingly engages the core strip material downstream of the spacer and upstream of where the adhesive is applied to the core strip material to assist in spirally advancing the core strip material and fabric strip along the length of the mandrel.

26. The method of claim 25 wherein different diameter capstans are driven by a common drive motor to drive the belt drives at different speeds to compensate for different outer diameters of the spiral wraps of fabric strip and core strip material on the mandrel so that both belt drives spirally advance the fabric strip and core strip material at the same speed on the mandrel.

27. The method of claim 25 wherein two separate drive motors for the belt drives are electronically tied together to drive the belt drives at different speeds to compensate for different outer diameters of the spiral wraps of fabric strip and core strip material on the mandrel so that both belt drives spirally advance the fabric strip and core strip material at the same speed on the mandrel.

28. Apparatus for making roller covers comprising means for spirally wrapping a continuous length of thermoplastic core strip material around a mandrel, a spacer positioned between adjacent edges of each successive wrap of the core strip material around the mandrel to prevent such adjacent edges of the core strip material from overlapping each other to provide a spiral seam between such adjacent edges, means for applying a layer of adhesive over the spirally wrapped core strip material, and means for spirally wrapping a fabric strip over the adhesive layer to bond the fabric strip to the core strip material.

29. The apparatus of claim 28 wherein said means for applying a layer of adhesive comprises an extruder die head for extruding a hot thermoplastic film of the adhesive onto the spirally wrapped core strip material, the thermoplastic film being sufficiently hot when the fabric strip is spirally wrapped around the thermoplastic film to cause the thermoplastic film to bond the fabric strip to the core strip material.

30. The apparatus of claim 29 wherein the fabric strip has a thermoplastic backing, and means are provided for causing adjacent edges of the hot thermoplastic film to overlap each other over the spiral seam between the adjacent edges of the core strip material to provide sufficient adhesive at the spiral seam for flow of the adhesive into the spiral seam and into the interstices in the thermoplastic backing.

31. The apparatus of claim 28 wherein the spacer maintains a gap of between approximately 0.010 inch and 0.050 inch between the adjacent edges of the core strip material during spiral wrapping of the core strip material around the mandrel.

32. The apparatus of claim 28 further comprising means for mounting the spacer for limited movement in a direction parallel to the longitudinal axis of the mandrel to permit the spacer to track between the adjacent edges of the core strip material during the spiral wrapping of the core strip material around the mandrel and compensate for slight changes in the helix angle of the spiral wrap of core strip material around the mandrel.

33. The apparatus of claim 28 further comprising a guide for permitting limited movement of the spacer in a linear direction parallel to the longitudinal axis of the mandrel to compensate for slight changes in the helix angle of the spiral wrap of core strip material around the mandrel.

34. The apparatus of claim 28 further comprising means for adjusting the clearance space between the spacer and the outer diameter of the mandrel.

35. The apparatus of claim 28 further comprising a first belt drive drivingly engaging the fabric strip on the mandrel to spirally advance the fabric strip and underlying core strip material along the length of the mandrel, and a second belt drive drivingly engaging the core strip material downstream of the spacer and upstream of where the adhesive layer is applied to the core strip material to assist in spirally advancing the core strip material and fabric strip along the length of the mandrel.

36. The apparatus of claim 35 further comprising two different diameter capstans driven by a common drive motor for driving the belt drives at different speeds to compensate for different outer diameters of the spiral wraps of fabric strip and core strip material on the mandrel so that both belt drives spirally advance the fabric strip and core strip material at the same speed on the mandrel.

37. The apparatus of claim 35 further comprising two separate drives for the belt drives, and controller means for electronically controlling the speed of said separate drives to drive the belt drives at different speeds to compensate for different outer diameters of the spiral wraps of fabric strip and core strip material on the mandrel so that both belt drives spirally advance the fabric strip and core strip material at the same speed on the mandrel.

38. Apparatus for making roller covers comprising means for wrapping a hot thermoplastic film around a thermoplastic tubular form, and means for spirally wrapping a fabric strip around the thermoplastic film while the thermoplastic film is sufficiently hot to cause the thermoplastic film to bond the fabric strip to the tubular form.

* * * * *